(No Model.) 2 Sheets—Sheet 2.
J. N. WIGGIN.
MACHINE FOR HEMMING AND SEWING FRINGE TO SHADES.
No. 416,882. Patented Dec. 10, 1889.
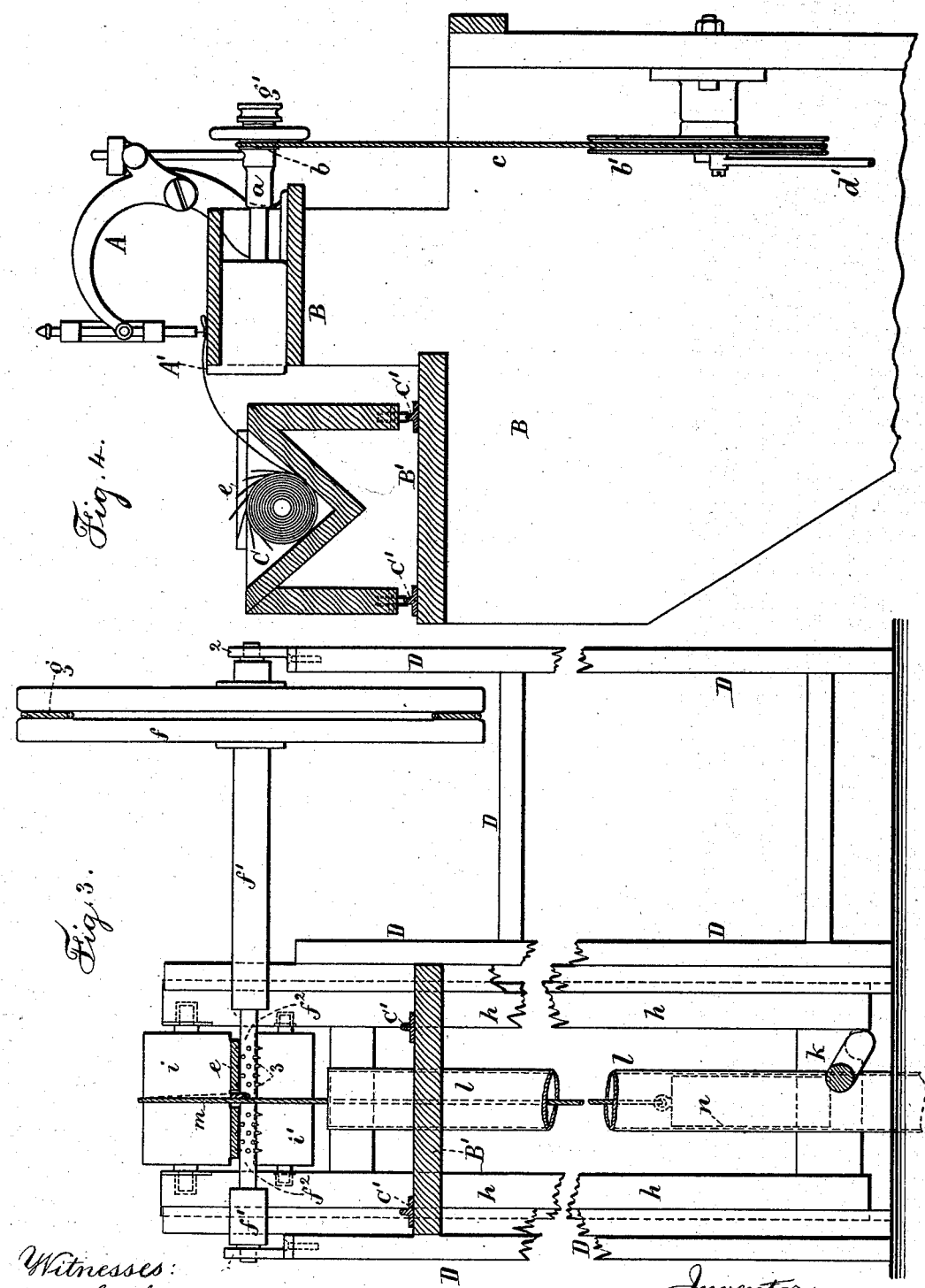
Witnesses:
J. Stail
Chas H Smith
Inventor:
Joseph N. Wiggin
per Lemuel W. Serrell Atty.

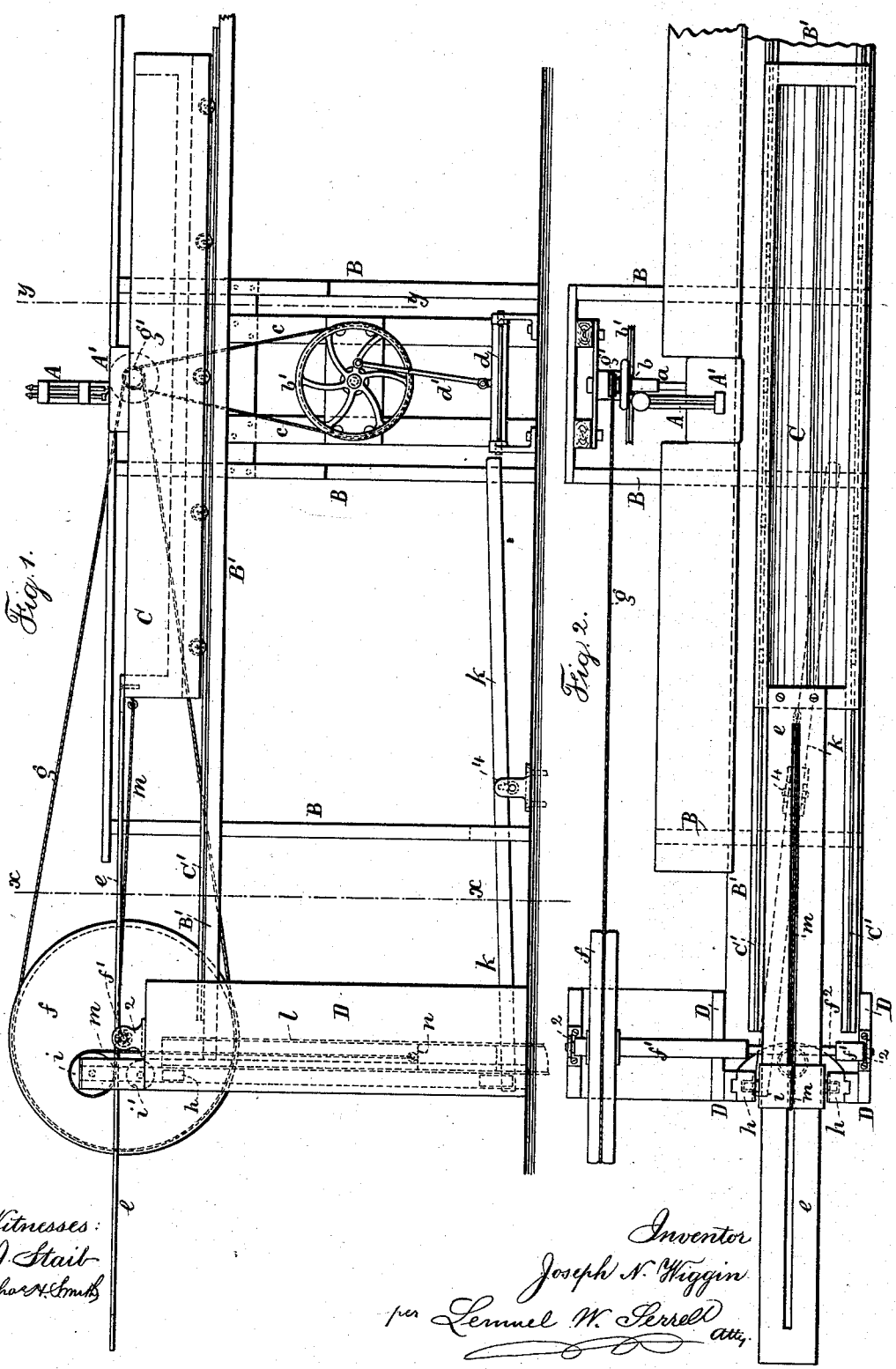

UNITED STATES PATENT OFFICE.

JOSEPH N. WIGGIN, OF ORANGE, NEW JERSEY.

MACHINE FOR HEMMING AND SEWING FRINGE TO SHADES.

SPECIFICATION forming part of Letters Patent No. 416,882, dated December 10, 1889.

Application filed March 11, 1889. Serial No. 302,840. (No model.)

*To all whom it may concern:*

Be it known that I, JOSEPH N. WIGGIN, of Orange, in the county of Essex and State of New Jersey, have invented an Improvement in Machines for Hemming and Sewing Fringe to Shades; and I do hereby declare that the following is a correct description of the same.

My invention relates to a device for forming the stick-pocket in one end of the shade fabric and for sewing fringe on the edge of said fabric; and said device consists in the combination, with a sewing-machine and a frame for the same, of a traveling carriage having draw-bars connected therewith and friction-rollers and an operating-shaft and pulleys actuated by the main shaft of a sewing-machine for drawing along the traveling carriage as the shade fabric is sewed.

The devices constituting my improvement are hereinafter more fully described.

In the drawings, Figure 1 is an elevation of my improvements. Fig. 2 is a plan of the same. Fig. 3 is a cross-section at the line $x\,x$ of Fig. 1, and Fig. 4 is a cross-section at the line $y\,y$ of Fig. 1.

A represents the sewing-machine arm, and A' the bed of the machine, and B the frame to which said machine is secured.

$a$ represents the main shaft of the sewing-machine, and $b\,b'$ the belt-wheels, $c$ the belt, $d$ the treadle, and $d'$ the connecting-rod. This sewing-machine may be of any desired character. I have, however, shown and preferably use a machine of the Willcox & Gibbs type.

C represents the traveling carriage, which is preferably of M shape in cross-section, with a V or trough shaped receptacle, and C' are tracks and rollers for the carriage, and B' is a horizontal bed to which said tracks are secured and over which the carriage C moves. At the left-hand end of this carriage C is a slotted draw-bar $e$, and D is a stationary frame, also at the left-hand end. The bed B' is secured to this stationary frame. There are vertical slideways in the stationary frame D, in which moves the slide-frame $h$, and there are rollers $i\,i'$ between the opposing faces of the slide-frame $h$, with their shafts or axes entering holes in such frame $h$, and there is a foot-lever $k$ pivoted at 4, one end of which lever is adjacent to the feet of the operator of the sewing-machine and the other end of which lever rests in a notch at the lower end of the slide-frame $h$, and by this foot-lever $k$ the frame $h$ can be raised when desired. The pulley $f$ is upon a shaft $f'$ in bearings 2, secured to the stationary frame D, and there is a belt $g$ which passes around such pulley $f$ and extends to and passes around the pulley $g'$ on the main shaft $a$ of the sewing-machine, and the revolution of the main shaft $a$ in operating the sewing-machine communicates motion by the belt $g$ to revolve the pulley $f$ and shaft $f'$. The shaft $f'$ has a reduced portion $f^2$, from the surfaces of which project spikes or pins, and the slotted draw-bar $e$ rests upon this reduced portion $f^2$ and passes beneath the roller $i$, and there is a cord $m$ secured to the end of the traveling carriage C, and this cord passes through the slot of the draw-bar $e$, around the roller $i$, and down into the tube $l$, and on the other end of this cord is a weight $n$ in the tube $l$. This tube $l$ is secured to the floor and to the bed B', and usually passes through the floor. The function of the weight $n$ is to draw down the roller $i$ against the upper face of the draw-bar $e$ and to press said draw-bar upon the roughened surface of the reduced shaft $f^2$, and the revolution of the pulley $f$ and shaft $f'\,f^2$ from the sewing-machine as the motor causes the spikes or pins 3 to enter the under surface of the draw-bar $e$ and to move the same and the traveling carriage C along with regularity.

The operation of the device is as follows: Supposing that the traveling carriage C is at its extreme movement toward the right hand of the operator, who faces the sewing-machine in its position Fig. 1. A roll of shade-fabric, cut to the desired length for shades, is placed in the trough-shaped receptacle of the traveling carriage, and one end, as turned over to form the stick-pocket, is placed beneath the presser-foot and vertical needle-bar of the sewing-machine. The operator now starts the machine and sews the fabric, and as the same is sewed the traveling carriage is drawn along at the same speed as the sewing by means of the belt $g$, pulley $f$, and its shaft $f'$ $f^2$ and the spikes upon the same, and this movement continues until the edge of the shade-fabric is reached and the sewing complete. The operator now places her foot on the end of the lever $k$ adjacent to the sewing-machine, and, pressing the same down, raises the slide-frame $h$ and rollers $i$ $i'$, together with the cord $m$ and weight $n$, and thus relieves the pressure upon the slotted draw-bar $e$ and lifts the draw-bars from the shaft $f^2$, so that the same can, with the traveling carriage, be moved back to the starting-point to sew a second piece of shade-fabric. The foot of the operator is then removed from the lever $k$, and the frame $h$ and other parts previously raised descend by their own weight, and pressure is again brought to bear upon the draw-bar $e$, so that the same can be moved along by the spikes or roughened surface of the shaft $f^2$, and the operations just described are repeated with each piece of shade-fabric that is sewed to form the stick-pocket, or upon the edge of which fringe is sewed.

In cases where the weight $n$ is sufficiently heavy the conditions set forth are reversed in the following manner, viz: The weight $n$ will draw on the cord $m$ and revolve the roller $i$ and draw along the drawer-bars $e$ and carriage C, and the tendency will be to complete the movement of the carriage quickly; but the spikes 3 of the shaft $f'$ $f^2$, taking against the under side of the draw-bar $e$, cause the simultaneous revolution of said shaft and the pulley $f$, and the belt $g$, passing around the pulleys $f$ and $g'$, acts as a brake-band governed by the speed of revolution of the pulley $g'$, whereby the speed of the draw-bars and traveling carriage is retarded and regulated and brought in unison with the feed of the sewing-machine. In place of the spikes 3 on the shaft $f^2$ the surface of said shaft and the under surface of said draw-bar, or both, might be covered with any desirable material which would produce between said parts an operative frictional contact in which there would be no slipping of the parts.

I claim as my invention—

1. The combination, with the sewing-machine and its supporting mechanism, of a traveling carriage having a trough-shaped receptacle for the roll of fabric to be sewed, rollers and tracks for supporting such carriage adjacent to the sewing-machine, a draw-bar connected to the end of the carriage, a revolving shaft acting on the draw-bar to move the same at the speed of the sewing-machine feed, a sliding frame and two rollers carried thereby, one below to lift the draw-bar and the other above to press the draw-bar down, and a lever to act upon the sliding frame to lift the draw-bar out of contact with the feed-shaft, substantially as set forth.

2. The combination, with a sewing-machine and its supporting-frame, of a traveling carriage or conveyer for fabrics to be sewed, a draw-bar connected to said carriage, a stationary frame D, a sliding frame and rollers adapted to move vertically therein, a pulley $f$ and its shaft, mounted in bearings in the stationary frame D, and a belt $g$ from the pulley $f$ to the main shaft of the sewing-machine, said pulley $f$ being of a size adapted to impart to the traveling carriage and its draw-bar a progressive movement in unison with the speed of the feed in the sewing-machine, substantially as set forth.

3. The combination, with the sewing-machine and its supporting-frames and the bed B' and stationary frame D, of the traveling carriage or conveyer C and tracks for the same on the bed B', and the slotted draw-bar $e$, connected to said carriage, the sliding frame $h$, the rollers $i$ $i'$, connected to said frame, the foot-lever $k$, for raising said frame, the pulley $f$, the belt $g$, the shaft $f'$ $f^2$ in bearings 2 upon the frame D, and mechanisms, substantially as specified, for pressing the draw-bar $e$ upon the shaft $f^2$ and creating frictional contact, so that the revolution of the shaft will move along the draw-bar and traveling carriage, substantially as set forth.

4. The combination, with the sewing-machine and its supporting-frames and the bed B' and stationary frame D, of the traveling carriage or conveyer C and tracks for the same on the bed B', and the slotted draw-bar $e$, connected to said carriage, the sliding frame $h$, the rollers $i$ $i'$, connected to said frame, the foot-lever $k$, for raising said frame, the pulley $f$, the belt $g$, the shaft $f'$ $f^2$ in bearings 2 upon the frame D, and a cord $m$, connected at one end to the traveling carriage and passing through the slot of the draw-bar $e$ and around the roller $i$, and a weight $n$ upon the other end of the cord, and a tube $l$, vertically placed and in which the weight $n$ moves, substantially as set forth.

Signed by me this 6th day of March, A. D. 1889.

JOSEPH N. WIGGIN.

Witnesses:
  GEO. T. PINCKNEY,
  HAROLD SERRELL.